United States Patent [19]

Bossler

[11] Patent Number: 5,432,338
[45] Date of Patent: Jul. 11, 1995

[54] SILICON OPTO-ELECTRONIC INTEGRATED CIRCUIT FOR FIBER OPTIC GYROS OR COMMUNICATION

[75] Inventor: Franklin B. Bossler, Williamsville, N.Y.

[73] Assignee: AlliedSignal Inc., Morris Township, Morris County, N.J.

[21] Appl. No.: 144,922

[22] Filed: Oct. 28, 1993

[51] Int. Cl.6 .......................... G02B 6/10; G02B 5/30
[52] U.S. Cl. .............................. 250/227.11; 250/216; 250/227.14; 250/227.16; 250/908
[58] Field of Search ............. 250/216, 227.11, 227.14, 250/227.16, 904, 908

[56] References Cited

U.S. PATENT DOCUMENTS 5,091,980  2/1992  Ogawa et al. ................... 250/227.11
5,175,781  12/1992  Hockaday et al. ................... 385/49
5,298,739  3/1994  Hiroki et al. ................... 250/227.11

FOREIGN PATENT DOCUMENTS 3224518  1/1984  Germany .

OTHER PUBLICATIONS

Patent Abstracts of Japan vo. 17, No. 522 (P-1616) 20 Sep. 1993 & JP, A, 05 142 348 (Sumitomo Electric).
Patent Abstracts of Japan, vol. 17, No. 509 (P-1612) 13 Sep. 1993 & JP A, 05 133 759 (Sumitomo Metal Mining).
Applied Optics, vol. 20, No. 9, 1 May 1981.

Primary Examiner—William L. Sikes
Assistant Examiner—Fetsum Abraham
Attorney, Agent, or Firm—Donald B. Paschburg

[57] ABSTRACT

An opto-electronic integrated circuit contains a coupler and one or two detector/receivers which may be on a silicon substrate which permits "blind" attachment of optical fibers by means of precision grooves and vertical cuts. By simplifying the typical optical circuit, through a reduction in components and connections, significant cost savings are obtained.

7 Claims, 2 Drawing Sheets

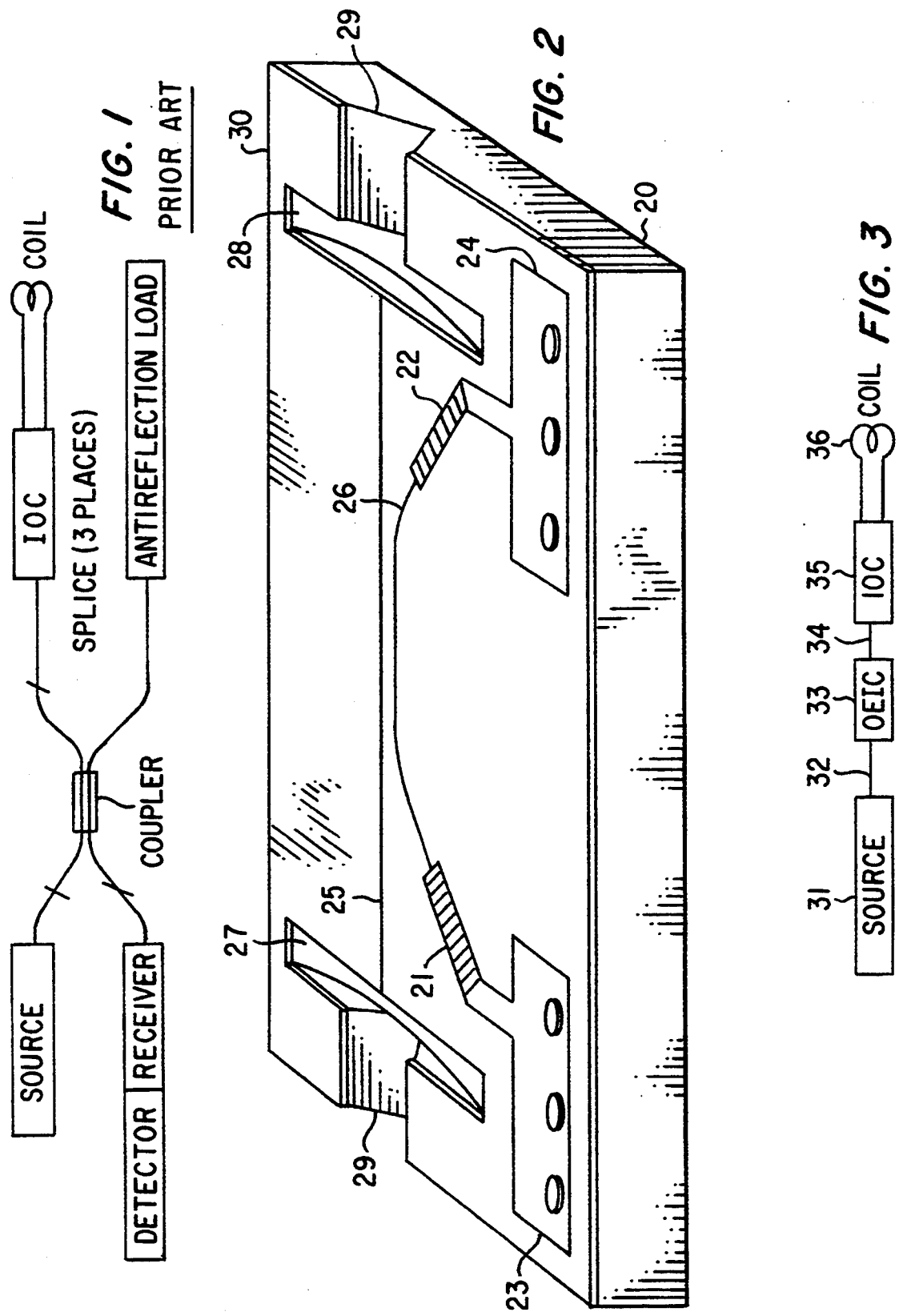

SILICON OPTO-ELECTRONIC INTEGRATED CIRCUIT FOR FIBER OPTIC GYROS OR COMMUNICATION

BACKGROUND OF THE INVENTION

1. Field of the Invention

The present invention relates to fiber optic gyros and communication systems and more particularly to those devices operating at wavelengths where Opto-Electronic Integrated Circuits (OEICs) utilizing silicon substrates can be used.

2. Description of the Prior Art

The typical prior art optical circuit for a fiber optic gyro is shown in FIG. 1, wherein the coupler is emphasized. The coupler is assembled into the circuit by means of three splices which are usually done manually, and hence are time-consuming and expensive. In addition, the detector/receiver and the anti-reflection load are separate components which must be handled (manufactured or purchased, tested and evaluated, stocked, and tracked in production). FIGS. 4 and 6 show typical prior art optical communication circuits wherein similar arrangements of coupler and detector/receiver are employed.

Recent advances in the technology of silicon OEICs and the techniques of "blind" attachment of optical fibers to such OEICs are described in application serial number 246-93-008 titled Method of Attaching Optical Fibers and application Ser. No. 08/113,940 titled Silicon Opto-Electronic Integrated Circuit (OEIC) For A Fiber Optic Gyro Using a 3×3 Coupler, both assigned to the same assignee as the present invention. These improvements make cost-saving modifications of the optical circuits possible.

SUMMARY OF THE INVENTION

The present invention provides for a simplification of the production of fiber optic gyros and communication systems by using a silicon OEIC to replace the coupler, detector/receiver, and the anti-reflection load; and by using precision grooves and appropriate means incorporated in the OEIC to permit "blind" attachment of the optical fibers to the OEIC without the necessity of splices.

BRIEF DESCRIPTION OF THE DRAWINGS

FIG. 1 is a schematic representation of a prior art optical circuit typically used for fiber optic gyros.

FIG. 2 is a pictorial representation of the OEIC of the present invention.

FIG. 3 is a schematic representation of the simplified optical circuit of FIG. 1 utilizing the present invention.

DETAILED DESCRIPTION OF THE INVENTION

Figure 4:
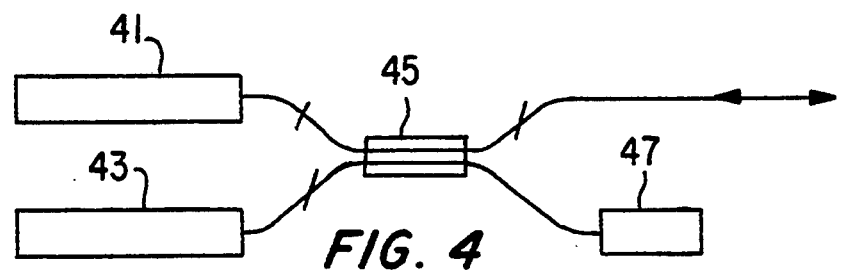
FIG. 4 is a schematic representation of a "full-duplex" fiber optic communications scheme.

Referring to FIG. 2, the OEIC comprises a silicon substrate 20 on which the detector regions 21 and 22 and the receiver electronic circuits 23 and 24 have been prepared by conventional solid-state electronic fabrication methods. These are overlaid by a transparent layer 30 (glass, silicon dioxide, or the like) in which the waveguides 25 and 26 are created by photolithographic patterning, etching, ion removal or implantation, or other suitable methods. The waveguides are positioned and dimensioned as a 3 db (i.e., 50/50) coupler so that when light is transmitted into fiber attachment 27, half of the energy (more or less) is transmitted to fiber attachment 28, and half to detector area 22. Then, due to symmetry, when light is transmitted into fiber attachment 28, half will be transmitted to fiber attachment 27 and half to detector area 21. Coupling of the light from waveguides 26 into the underlying detector areas of the substrate is facilitated by a grating pattern imposed on the waveguide, such that the optical energy is diffracted both up (out of the waveguide) and down into the detector area of the substrate. The upward-directed energy is then reflected downward by Total Internal Reflection (TIR) from the top surface of the transparent layer 30 and also impinges on the detector area, thus providing efficient coupling of (almost) all of the optical power from waveguide 26 to the appropriate detector, with very low back-reflection. To accomplish this, the period of the grating should be 2 to 3 times the wavelength of the light in the transparent layer 30, thus scattering the energy at angles of 40 to 60 degrees to the direction of the guide. The grating can be formed by varying the waveguide propagation periodically by varying the thickness, width, or cladding dimensions. The grating should be in the order of 100 wavelengths long, but need be no more than 5 or 10 wavelengths wide.

Provision for "blind" attachment of the fibers is critical to the achieving of cost reduction in production. As described at length in application serial number 246-93-008 titled Method of Attaching Optical Fibers, and assigned to the same assignee as the present invention, this can be accomplished by the use of precision grooves 29 etched into the silicon substrate, combined with vertical cuts 27, 28, which permit "face-contact" of the perpendicular end of the fibers with the waveguide 25 in the surface layer 30. The vertical cuts can be provided by mechanical means, after the etching of the grooves; or by mechanical or electrochemical means before the etching of the grooves. Mechanical means useful after the etching of the grooves include cutting with a high-speed dentist's burr, and ultrasonic grinding. Mechanical means useful before the etching of the grooves include ultrasonic grinding, while electrochemical means include reactive ion etching. Preparation of the perpendicular end of the fibers may be accomplished by precision cleaving or by etching with hydrofluoric acid to produce a rounded end, or both; or may be accomplished by polishing in a suitable fixture.

The package is completed by inserting the prepared fibers into their precision grooves; applying index-matching epoxy if necessary; clamping with a hold down plate; curing the epoxy with UV radiation if required; making electrical contact with the electronic circuits, possibly using solder-bumps on the hold-down plate; encasing in a light-tight and electromagnetic shield if necessary; and providing strain-relief to the fibers if necessary. However, the present invention consists only of the OEIC and not the complete package or the gyro. In production, these steps can be very economical if properly engineered, since the basic OEIC should be producible in more or less standard silicon fabrication facilities, supplemented with the processes for producing the holes 27 and 28 for fiber attachment.

FIG. 3 shows a schematic of the optical components of a fiber optic gyro using the OEIC of the present invention. Source 31 is connected to OEIC 33 through fiber 32. IOC 35 is connected to OEIC 33 by fiber 34 and coil 36 is connected at the other end of IOC 35. Compared to the conventional prior art optical gyro layout of FIG. 1, the present invention would eliminate two components and three splices, thus reducing cost and improving reliability.

Note that, in FIG. 2, there are shown two identical gratings/detectors 21 and 22, and receivers 23 and 24. While the two receivers are, strictly speaking, not necessary in some applications, they provide a useful function by making the OEIC symmetrical for assembly purposes. They also improve the yield of the OEIC manufacturing process since a manufacturing defect in either receiver will not make the whole device unusable for many applications such as gyro and duplex communication applications. The second receiver is provided at very little incremental cost, since all of the manufacturing tools, fixtures, and processes required to provide one receiver circuit can simultaneously create both receivers. Also, the "real-estate" (area of the substrate) required for the second receiver is already available due to the requirements of the optical circuit. Furthermore, the OEIC with two receivers can have additional applications.

Figure 5:
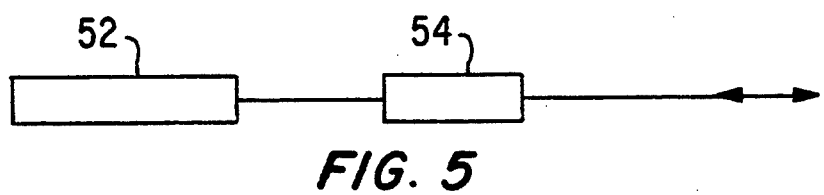
FIG. 5 shows the simplification of FIG. 4 using the present invention.

FIGS. 4 and 5 show another application of the present invention. In a fiber optic communication system it is frequently desirable to operate in a "full-duplex" mode which is to transmit and receive on a single fiber. This may well be less costly than having to provide separate fibers for transmitting and receiving signals. This is traditionally achieved, as it is in standard telephony, by the use of a hybrid, or, as it is called in optical terminology, a coupler. FIG. 4 illustrates transmitter 41 and receiver/detector 43 connected through individual fibers to coupler 45. Load 47 is connected through a single fiber to coupler 45. The present invention greatly simplifies the full-duplex use of fibers by eliminating two components and three splices. FIG. 5 illustrates transmitter 52 connected to OEIC 54 through a single fiber.

Figure 6:
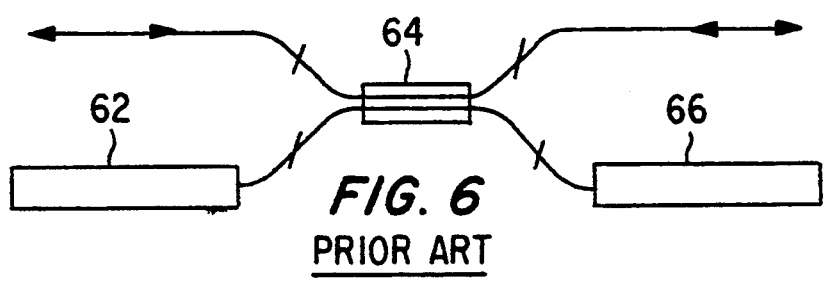
FIG. 6 is a schematic representation of a "tap" on a bi-directional token-ring-network.
Figure 7:
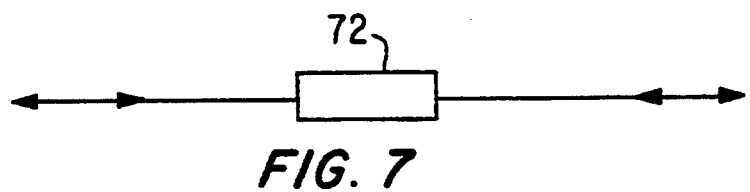
FIG. 7 shows the simplification of FIG. 6 using the present invention.

FIGS. 6 and 7 show yet another use of the present invention in a communications application. In a bi-directional token-ring-network, signals can flow in both directions. It is desirable, and sometimes necessary, to detect these signals separately. For this application, the coupler will usually be configured as a 20 dB coupler; that is, only 1% of the power flowing in one direction will be coupled to one direction, and 1% of the power flowing in the opposite direction will be coupled to the other detector. FIG. 6 shows that this can be done (at a cost of 1% loss in each direction) by coupler 64, using two detector/receivers 62 and 66 and four splices. FIG. 7 shows that OEIC 72 of the present invention with a suitable configured coupler can greatly simplify this bi-directional tap with a single component and no splices.

It is not intended that this invention be limited to the hardware arrangement or operational procedures disclosed. This invention includes all of the alterations and variations thereto as encompassed within the scope of the claims as follows.

What is claimed is:

1. An opto-electronic integrated circuit, comprising: substrate means;
   first and second detector regions formed in one and the opposite ends of said substrate means, respectively;
   first and second receiver means formed in the one and the opposite ends of said substrate means, respectively, and coupled to a corresponding one of the first and second detector means;
   a transparent layer disposed on the substrate means so as to overlay the first and second detector regions and the first and second receiver circuit means;
   first and second waveguide means formed in said layer;
   first fiber attachment means formed in the one end of the substrate means and second fiber attachment means formed in the opposite end of said substrate means; and
   said first and second waveguide means arranged as a coupler so that when light energy is transmitted into one of the first and second fiber attachment means substantially half of the light energy is transmitted to the other of the first and second fiber attachment means and half to its corresponding detector region, and when light energy is transmitted into the other of the first and second fiber attachment means substantially half of the light energy is transmitted to the one of the first and second fiber attachment means and half to its corresponding detector region.

2. The opto-electronic integrated circuit as described by claim 1, including:
   a grating pattern disposed on one of the first and second waveguide means whereby transmission of light energy from the one waveguide means to the first and second detector regions is facilitated.

3. The opto-electronic integrated circuit as described by claim 2, wherein:
   the grating pattern is such that light energy is diffracted upwardly and out of the one waveguide means and downwardly into the detector regions.

4. The opto-electronic integrated circuit as described by claim 3, wherein:
   the upwardly refracted light energy is reflected downwardly by total internal reflection from the top surface of the transparent layer while impinging on the detector regions for coupling the light energy from the one waveguide means to the detector regions with low back-reflection.

5. The opto-electronic integrated circuit as described by claim 1, including:
   non-reflective load means; and
   the detector regions, the coupler and the non-reflective load means being components of a fiber optic gyro.

6. The opto-electronic integrated circuit as described by claim 5, wherein:
   the substrate means is a silicon substrate which permits connection of optical fibers by means of "blind" attachment through precision grooves and vertical cuts.

7. The opto-electronic integrated circuit as described by claim 5, wherein:
   the detector regions, the coupler and the non-reflective load means enable duplex communication using a single optical fiber.

* * * * *